United States Patent [19]

Holub et al.

[11] 4,374,214

[45] Feb. 15, 1983

[54] IMIDE CONTAINING BLENDS AND POLYMERIC COMPOSITIONS PREPARED THEREFROM

[75] Inventors: Fred F. Holub, Schenectady, N.Y.; John T. Hoback, Wilmington, Del.

[73] Assignee: General Electric Company, Schenectady, N.Y.

[21] Appl. No.: 239,963

[22] Filed: Mar. 3, 1981

Related U.S. Application Data

[60] Continuation of Ser. No. 167,125, Jul. 9, 1980, abandoned, which is a continuation of Ser. No. 785,501, Apr. 7, 1977, abandoned, which is a continuation-in-part of Ser. No. 487,715, Jul. 11, 1974, abandoned, which is a continuation of Ser. No. 375,715, Jul. 2, 1973, abandoned, which is a division of Ser. No. 200,590, Nov. 19, 1971, Pat. No. 3,763,087.

[51] Int. Cl.³ .............................................. C08L 63/02
[52] U.S. Cl. ..................................... 523/466; 528/117

[58] Field of Search ................... 260/37 EP; 528/117; 523/466

[56] References Cited

U.S. PATENT DOCUMENTS 3,875,113  4/1975  Lefebvre et al. ............... 260/37 EP

OTHER PUBLICATIONS

Lee et al.; Handbook of Epoxy Resins; McGraw-Hill Book Co.; 1967; pp. 82–87.

*Primary Examiner*—Lewis T. Jacobs
*Attorney, Agent, or Firm*—William A. Teoli; James C. Davis, Jr.

[57] ABSTRACT

Resins are obtained from blends of epoxide and imide containing or derived compounds, which have good resistance to mechanical deformation at elevated temperatures and good adhesion to inorganic materials such as metals and ceramics. These resins are particularly useful for making composite materials and molded articles.

5 Claims, No Drawings

IMIDE CONTAINING BLENDS AND POLYMERIC COMPOSITIONS PREPARED THEREFROM

This application is a continuation of Ser. No. 167,125, filed July 9, 1980, abandoned, which is a continuation of Ser. No. 785,501, filed Apr. 7, 1977, abandoned which is a continuation-in-part application of copending application Ser. No. 487,715, filed July 11, 1974, abandoned, which is a continuation of application Ser. No. 375,715, filed July 2, 1973, now abandoned, which is a division of application Ser. No. 200,590, filed Nov. 19, 1971, now U.S. Pat. No. 3,763,087, all applications being assigned to the same assignee as the present invention.

This invention is concerned with improved polymeric compositions prepared from blends of epoxides and imides. More particularly the invention relates to compositions of matter comprising (a) an epoxy resin; and (b) a mixture consisting essentially of a bisimide, and organic diamine. The composition is cured in the presence of organic diamine and/or in the presence of a free radical catalyst.

There is provided by the present invention a composition of matter comprising (1) from about 10 to about 90 mole percent of an epoxy resin selected from the group consisting of a polyglycidyl ether of a polyhydric phenol and an epoxidized olefin;
(2) from about 90 to about 10 mole percent of a bisimide having the general formula:

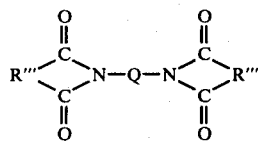

wherein R''' is a member selected from the class consisting of

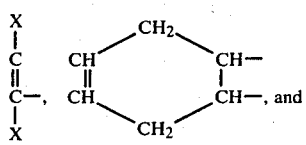

groupings, and halogenated derivatives, Q is a member selected from the group consisting of alkylene containing from 2–20 carbon atoms, cycloalkylene, alkylcycloalkylene, xylylene, phenylene, lower alkylene,

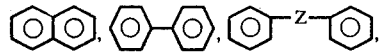

wherein Z is a member selected from the group consisting of divalent aliphatic, cycloaliphatic, or araliphatic (having 1–8 carbon atoms), —O—,

—S—, and —$SO_2$—, X is a member of the class consisting of hydrogen, halogen, and the methyl radical, and m is 0 or 1; and (3) from about 1% to about 30% by weight of an organic diamine of the formula:

$NH_2$—Q'—$NH_2$, wherein Q' is defined by the symbol Q hereinabove, based on the total weight of (1), (2) and (3).

The epoxy resins used in the present invention are commercially available and have the general formula:

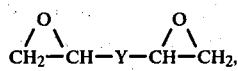    I.

wherein Y is the residue of the reaction product of a polyfunctional halohydrin, such as epichlorohydrin, and a polyhydric phenol. These resins are well known and commercially available. Typical phenols useful in the preparation of the resin are resorcinol and various bisphenols resulting from the condensation of phenol with aldehydes and ketones such as formaldehyde, acetaldehyde, and acetone. Representative of the bisphenols is 2,2'-bis(p-hydroxyphenyl)propane (known as Bisphenol-A); 4,4'-dihydroxydiphenylsulfone; 4,4'-dihydroxy biphenyl, 4,4'-dihydroxydiphenylmethane; 2,2'-dihydroxydiphenyloxide, etc.

The epoxy resin useful for most applications in forming the blends used in the practice of the present invention corresponds to the general formula:

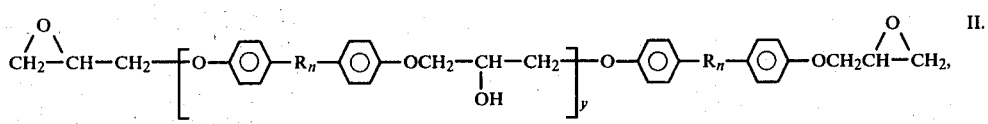 II.

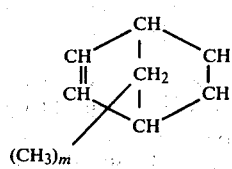

where R is a divalent radical selected from the group consisting of saturated alkylene radicals of from 1 to 8 carbon atoms, oxygen, and the sulfone group, y is 0 or an integer having a value up to 25 and n is 0 or 1. Specifically, R may be methylene, ethylene, propylene, isopropylene, isopropylidene, butylene, isobutylene, etc.

The most common epoxy resin of this type is the reaction product of epichlorohydrin and Bisphenol-A which corresponds to the structural formula:

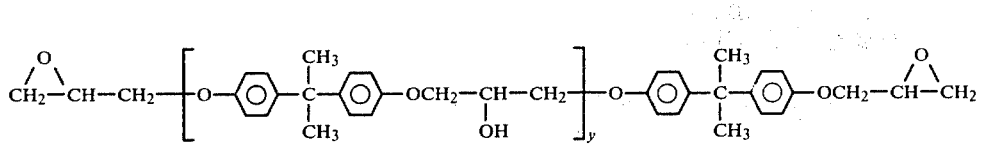

wherein y has the meaning given above.

The instant epoxy resin may also be an epoxy novolac resin. These resins are commercially available and correspond to the formula:

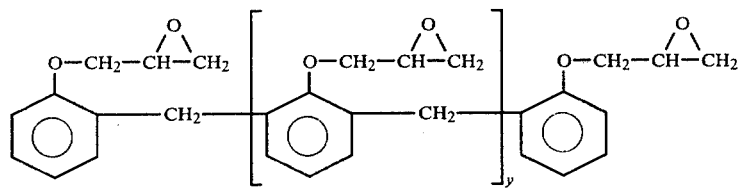

wherein y has the value given above.

An epoxy resin which is formed from tetraphenylol ethane and epichlorohydrin is also suitable and corresponds to the formula:

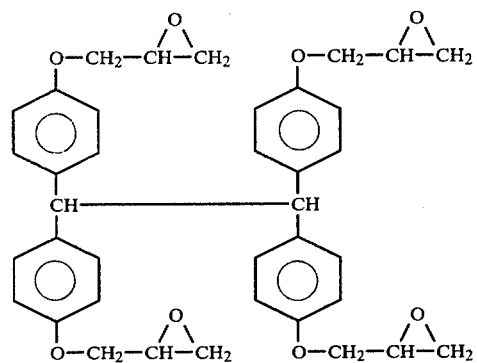

Epoxy resins which are epoxidized olefins can also be used in the present invention. An example of one such resin is a dicyclohexane diepoxide carboxylate which has the formula:

$$O(C_6H_8) (CH_3) CH_2OCO(C_6H_8) (CH_3) O \qquad VI.$$

Other examples include vinyl cyclohexene dioxide and dipentene dioxide.

The instant epoxy resin may be liquid or solid. It generally has an epoxy equivalent in the range of 100 to 4000 and preferably from 150 to 450. The epoxy equivalent weight is the weight of resin in grams which contain one gram equivalent of epoxy.

In preparing the blend of the present invention, the epoxy resin may be mixed directly with the bisimide and organic diamine to form a curable mixture.

The imide portion of the blend is supplied by a bisimide, the reaction product of a diamine with a bisimide, or the reaction product of trimellitic anhydride with a diamine, to form an amide-imide. The bisimide has the general formula:

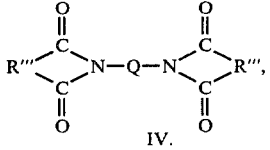

wherein R''' is a member selected from the class consisting of:

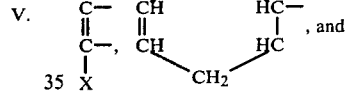

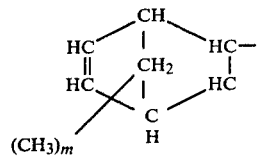

groupings, and halogenated derivatives, Q is a member selected from the group consisting of alkylene containing from 2-20 carbon atoms, cycloalkylene, alkylcycloalkylene, xylylene, phenylene, lower alkylphenylene,

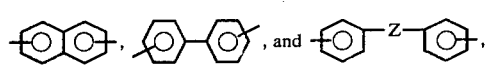

wherein Z is a member selected from the group consisting of divalent aliphatic, cycloaliphatic or araliphatic (having 1-8 carbon atoms), —O—,

—S—, and —SO$_2$—, X is a member of the class consisting of hydrogen, halogen and the methyl radical, and m is 0 or 1.

The organic diamines useful in the present invention may be represented by the general formula:

$$NH_2-Q'-NH_2$$

wherein Q' is defined by the same radicals as Q set forth hereinabove. Typical of such diamines are the following:

m-phenylenediamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5'-diaminonaphthalene,
3,3'-dimethylbenzidine,
3,3'-dimethoxybenzidine,
2,4'bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane,
m-xylylenediamine,
p-xylylenediamine,
bis(4-aminocyclohexyl)methane,
decamethylenediamine,
3-methylheptamethylenediamine,
4,4'-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanedimaine,
bis(3-aminopropyl)sulfide,
N-methyl-bis(3-aminopropyl)amine,
hexamethylenediamine,
heptamethylenediamine,
nonamethylenediamine, and mixtures thereof. It should be noted that these diamines are given merely for the purpose of illustration and are not considered to be all inclusive. Other diamines not mentioned will readily be apparent to those skilled in the art.

Having described the bisimide and the diamine, the reaction product of the bisimide and the diamine can occur in various ratios from 1:1 to 2:1 respectively. An illustration wherein the ratio is 2:1 is represented by the general formula:

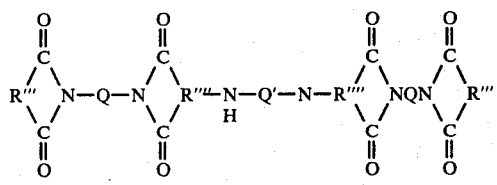

VIII.

wherein R''', Q and Q' are as described hereinabove (the Q' radical derived from the diamine is frequently not the same as the Q derived from the bisimide) and R'''' is the same as R''' with the exception that a primary amino group from the diamine has been reacted with the double bond of the imide group. Other polymeric forms which fall within the prescribed range of ratios are more complicated. A particular useful unsaturated amide imide is one prepared from 2.5 moles of bismaleimide with 1 mole of methylene dianiline.

As a further embodiment of our invention, the epoxy resin may be blended with the reaction product of trimellitic anhydride with a diamine as illustrated by the following formula:

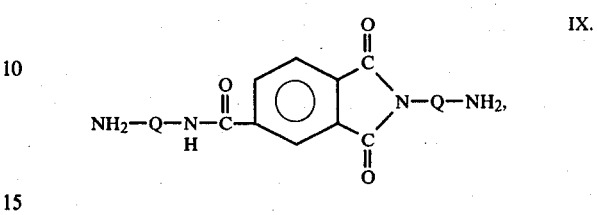

IX.

wherein Q is as defined hereinabove.

The ratio of the diepoxide to the bisimide in the blend may vary over a wide range and will depend to some extent on the terminal functional groups on the compounds being reacted. For example, 25–75 mole percent of the diepoxide may be reacted with 25–75 mole percent of an amine containing polyunsaturated imide ually in the presence of an amine curing agent.

To prepare the composition of the present invention, conventional techniques can be used to produce a blend of the epoxide and imide containing compounds and any other ingredients including copolymerizable compounds, fillers, pigments, etc. For example, the components can be admixed by hot milling on a mill or a mixer. If the free radical source is an organic peroxide, it can be milled at the same time with the other components.

The composition is then shaped by any conventional method to the desired form before curing. The shaped composition is cured by a free radical mechanism and any source of free radicals can be used including organic peroxides as well as actinic radiation. Curing can also be effected at elevated temperatures in an oxygen containing atmosphere.

Organic peroxides having a decomposition point in excess of about 100° C. are preferred in order to minimize loss of peroxide during the elevated milling temperatures used. The preferred peroxides are dicumyl peroxide and α,α'-bis(t-butylperoxy)diisopropylbenzene. Other useful peroxides include benzoyl peroxide, dibenzoyl peroxide, di-t-butyl-peroxide, t-butylbenzoyl peroxide, cumene hydroperoxide, and lauroyl peroxide. Also effective are the azo compounds, such as azobisisobutyronitrile. The amount of catalyst may vary widely. Generally the catalyst can be used in an amount of 0.01–5.0% by weight of the total polymer blend.

Fillers, pigments and dyes may be used in making the polymer blend of the present invention. The fillers may be in the form of particles or fibers. Typical fillers include ground ceramics, glass, silica, quartz, mica, treated clays, titanium dioxide, boron nitride, graphite, carbon black, glass fibers, asbestos fibers, and metal powders such as iron powder, copper powder or aluminum powder. The amount of filler used depends on the particular properties of the composition desired. Filler in amounts of up to about 300 percent by weight of the polymer composition may be used.

In the compounding of the present compositions, other modifying materials which do not have a detrimental effect on the properties of the cured composition, such as antioxidants, heat stabilizers, and lubricants may be included. The blending and heat curing of the composition can be varied widely. Thus, the curing temperatures may vary from about 125°–250° C. for a time of 1 minute to 2 hours or more. Molding pressures of 5 psi to 5000 psi or more may be used. Any conventional molding technique such as compression molding, extrusion, injection, etc., may be employed.

In order to reduce cost and to modify some of the properties of the cured polymer, such as hardness, stiffness, and ultraviolet resistance, various aliphatically unsaturated compounds containing up to 3 or more unsaturated groups per molecule such as chlorostyrene, methylmethacrylate, methylacrylate, diallylphthalate, triallyl cyanurate, triallyl isocyanurate, maleimideo-substituted polybenzylene, etc., may be substituted in an amount up to 80 weight percent for the epoxy acrylate.

In order that those skilled in the art may better understand how the present invention may be practiced, the following examples are given by way of illustration and not by way of limitation. All cut-through tests were conducted in the manner described in U.S. Pat. No. 2,936,296.

EXAMPLE 1

A mixture of 10 parts by weight of an epoxy resin prepared from epichlorohydrin and Bisphenol-A having a viscosity of 100–160 poises at 25° C. and an epoxy equivalent of 185–192), 2 parts by weight of a bismaleimide (prepared from maleic anhydride and p,p'-methylenedianiline hereinafter designated as "BMI"), 2 parts by weight of m-phenylene diamine was blended together with 0.02 parts by weight of dicumyl peroxide catalyst at a temperature of 80° C. The reaction product was cast into a film and cured at 160° C. for 2 hours. The cured film was flexible and had a cut-through temperature of 315° C.

EXAMPLE 2

Following the procedure of Example 1, a film was prepared from 10 parts by weight of the epoxy resin of Example 1, 5 parts by weight of BMI, 2 parts by weight of m-phenylene diamine by blending together with 0.05 parts by weight of dicumyl peroxide at a temperature of 80° C. The cured film was flexible and had a cut-through temperature of 250° C.

EXAMPLE 3

Following the procedure of Example 1, 10 parts by weight of epoxy resin of Example 1 and 5 parts by weight of an amide-imide diamine having the formula:

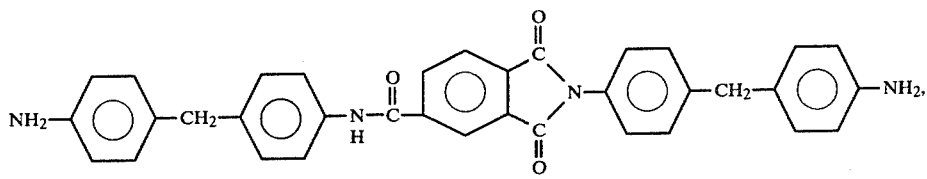

was blended at a temperature of 80° C. The product was cast into a film and cured at 160° C. for 2 hours. The cured film was flexible and had a cut-through temperature of 350° C.

EXAMPLE 4

Following the procedure of Example 3, a film was prepared from 10 parts by weight of the epoxy resin of Example 1 and 2 parts by weight of the amide-imide diamine of Example 3 at a temperature of 80° C. The cured film was flexible and had a cut-through temperature of 340° C.

EXAMPLE 5

Following the procedure of Example 1, 10 parts by weight of epoxy resin of Example 1, 2 parts by weight of

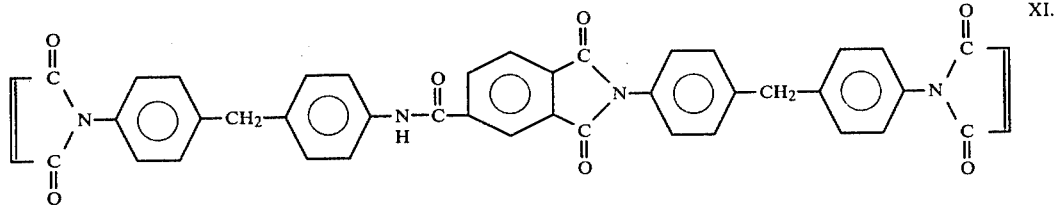

and 2 parts by weight of m-phenylenediamine was blended together with 0.02 parts by weight of dicumyl peroxide. The cured film was flexible and had a cut-through temperature of 330° C.

EXAMPLE 6

Following the procedure of Example 1, a mixture of 10 parts by weight of the epoxy resin, 2 parts by weight m-phenylene diamine and 2 parts by weight of bismaleimide prepared by reacting 2.5 moles of BMI with 2 moles of p,p'-methylene dianiline was blended together at a temperature of 80° C. The reaction product was cast into a film and cured at 160° C. for 2 hours. The cured film was flexible and had a cut-through temperature of 350° C.

EXAMPLE 7

Following the procedure of Example 6, a mixture of 10 parts by weight of the epoxy resin, 2 parts by weight of BMI and 2.7 parts by weight of p,p'-methylene dianiline was blended together at 80° C. The reaction product was cast into a film and cured at 160° C. for 2 hours. The cured film was flexible and had a cut-through temperature of 325° C.

EXAMPLE 8

Following the procedure of Example 7, a mixture of 10 parts by weight of the epoxy resin, 2 parts by weight of BMI and 5.4 parts by weight of p,p'-methylene dianiline was blended together at 80° C. The reaction product was cast into a film and cured at 160° C. for 2 hours. The cured film was flexible and had a cut-through temperature of 240° C.

EXAMPLE 9

Following the procedure of Example 7, a mixture of 10 parts by weight of the epoxy resin, 2 parts by weight of BMI, 2 parts by weight of m-phenylene diamine was blended together with 0.02 parts by weight of dicumylperoxide at a temperature of 80° C. The reaction product was cast into a film and cured at 160° C. for 2hours. The cured film was flexible and had a cut-through temperature of 335° C.

EXAMPLE 10

Following the procedure of Example 7, a film was prepared from a mixture of 10 parts by weight of the epoxy resin, 5 parts by weight of BMI, 2parts by weight of m-phenylene diamine, by blending at 80° C. with 0.05 parts by weight of dicumylperoxide. The film, cured at 160° C. for 2hours, was flexible and had a cut-through temperature of 350° C.

EXAMPLE 11

A mixture of 21.5parts by weight of epoxy acrylate resin (the product formed by reacting methacrylic acid with an epoxy resin of Example 1), 21.5 parts by weight of the bismaleimide of Example 6, 100 parts by weight of ¼" glass fibers and 1 part by weight of dicumylperoxide was milled at room temperature and then cured at 165° C.for 10 minutes. The resulting product had a flexural strength of 15,000, a flexural Modulus of $2.24 \times 10^6$ and a heat distortion temperature of 250° C. at 264 psi.

EXAMPLE 12

Following the procedure of Example 11, a mixture of 21.5 parts by weight of the epoxy acrylate of Example 11, 21.5 parts by weight of BMI, 100 parts by weight of the glass fibers and 1 part by weight of dicumyl peroxide was milled at room temperature and then cured at 165° C. for 10 minutes. The resulting product had a flexural strength of 13,700 psi, a flexural Modulus of $2.16 \times 10^6$, and a heat distortion temperature of >250° C. at 264 psi.

EXAMPLE 13

Following the procedure of Example 12, a mixture of 20 parts by weight of an epoxy acrylate resin, 20 parts by weight of bismaleimide (prepared from maleic anhydride and p,p'-methylene dianiline), 5 parts by weight triallyl cyanurate, 94 parts by weight of glass fibers, and 1 part by weight of dicumyl peroxide is milled at room temperature and then cured at 165° C. for 10 minutes. The resulting product is a solid thermosetting material useful for electrical insulation purposes.

EXAMPLE 14

Following the procedure of Example 12, 20 parts by weight of an epoxy resin of Example 1, 20 parts by weight of the reaction product of BMI and p,p'-methylene dianiline of Example 12, and 94 parts by weight of glass fibers was milled at room temperature and then cured at 165° C. for 1 hours. The resulting product had a flexural strength of 19,300 psi, a flexural Modulus of $2.21 \times 10^6$ psi.

EXAMPLE 15

Following the procedure of Example 12, a mixture of 5 parts by weight of the epoxy acrylate, 20 parts by weight of diallyl isophthalate, 10 parts by weight of a bisimide having the following formula:

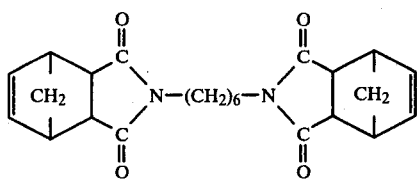

and 0.5 part of dicumyl peroxide was stirred in a glass beaker to yield a heterogeneous dispersion. The dispersion was cast on an aluminum substrate. The coated aluminum was then cured at a temperature of 150°–160° C. for 10 minutes to yield a clear adherent film which was crosslinked and solvent resistant, since the film did not dissolve in toluene.

It will be appreciated that the invention is not limited to the specific details shown in the examples and illustrations and that various modifications may be made within the ordinary skill in the art without departing from the spirit and scope of the invention.

What we claim as new and desire to secure by Letters Patent of the United States is:

1. Curable compositions comprising by weight,
   (A) an epoxy resin prepared from epichlorohydrin and bisphenol-A,
   (B) from about 0.2 to about 0.5 parts of a bismaleimide per part of (A),
   (C) from about 0.2 to about 0.5 part per part of (A) of an arylene diamine selected from the class consisting of metaphenylene diamine and para,para-methylene dianiline and
   (D) and 0.01–5% by weight of the curable composition of an organic peroxide.

2. A glass fiber filled composition in accordance with claim 1.

3. A curable composition in accordance with claim 1, where the bismaleimide is prepared from maleic anhydride and p,p-methylene dianiline.

4. A curable composition in accordance with claim 1, where the bismaleimide has the formula,

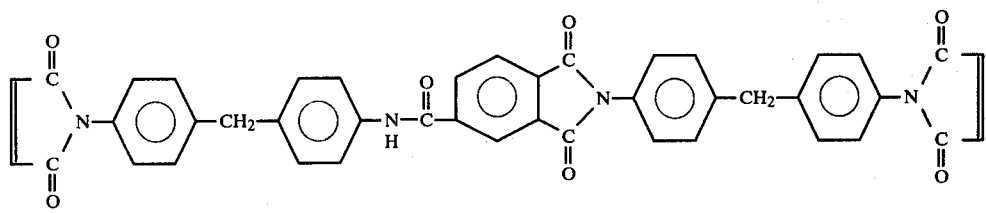

5. A curable composition in accordance with claim 1, where the organic peroxide is dicumyl peroxide.